United States Patent [19]

Sonnenberg

[11] Patent Number: 5,027,990

[45] Date of Patent: Jul. 2, 1991

[54] TIRE COVER APPARATUS

[76] Inventor: Brian L. Sonnenberg, 11728 Dunning St., Santa Fe Springs, Calif. 90670

[21] Appl. No.: 509,628

[22] Filed: Apr. 16, 1990

[51] Int. Cl.[5] .................. B60J 11/00; B62D 39/00
[52] U.S. Cl. ........................... 224/42.2; 224/42.31; 296/136; 296/98; 280/851
[58] Field of Search .............. 224/42.12, 42.2, 42.23, 224/42.31, 42.41; 150/166; 296/136, 37.2, 98, 83; 206/304, 304.1, 304.2; 280/848-851, 154

[56] References Cited

U.S. PATENT DOCUMENTS

| | | | |
|---|---|---|---|
| 1,111,189 | 9/1914 | Sly | 224/42.12 |
| 1,292,088 | 1/1919 | Schilke | 206/304.1 |
| 1,730,733 | 10/1929 | Judd | 296/136 X |
| 1,805,933 | 4/1930 | Victor | 280/851 X |
| 1,889,776 | 12/1932 | Crocker | 206/304.1 |
| 3,563,594 | 2/1971 | London | 150/166 |
| 3,940,165 | 2/1976 | Sogoian | 280/851 |
| 4,124,221 | 11/1978 | Goings | 280/851 |
| 4,657,298 | 4/1987 | Yong O | 296/136 |
| 4,727,898 | 3/1988 | Guma | 296/136 X |
| 4,848,823 | 7/1989 | Flohr et al. | 296/98 |

FOREIGN PATENT DOCUMENTS

| | | | |
|---|---|---|---|
| 2064694 | 7/1972 | Fed. Rep. of Germany | 296/136 |
| 90/03056 | 3/1990 | PCT Int'l Appl. | 296/98 |
| 0450190 | 4/1968 | Switzerland | 280/851 |
| 1025567 | 6/1983 | U.S.S.R. | 280/851 |
| 0169599 | 10/1921 | United Kingdom | 280/849 |

Primary Examiner—Henry J. Recla
Assistant Examiner—Casey Jacyna
Attorney, Agent, or Firm—Leon Gilden

[57] ABSTRACT

A tire cover apparatus including a cylindrical elongate housing rotatably and retractively mounting a flexible curtain therewithin. The curtain is directed through elongate slot wherein the slot includes a covering of felt strips to effectively clean and maintain the curtain in an operative condition minimizing the contamination of the curtain when maintained interiorly of the housing. A plurality of axially spaced clamps secure the housing in combination with an interior flange of an associated vehicular body including a mounting flange to prevent unauthorized removal of the housing relative to the automotive flange.

4 Claims, 4 Drawing Sheets

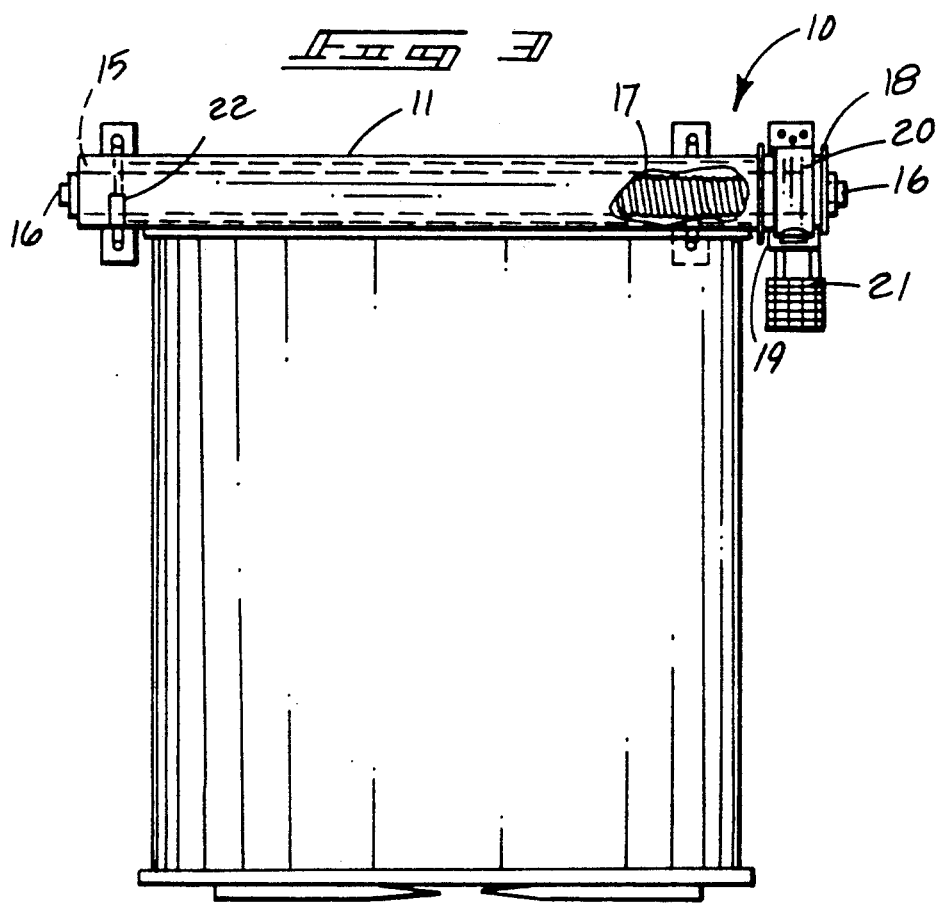
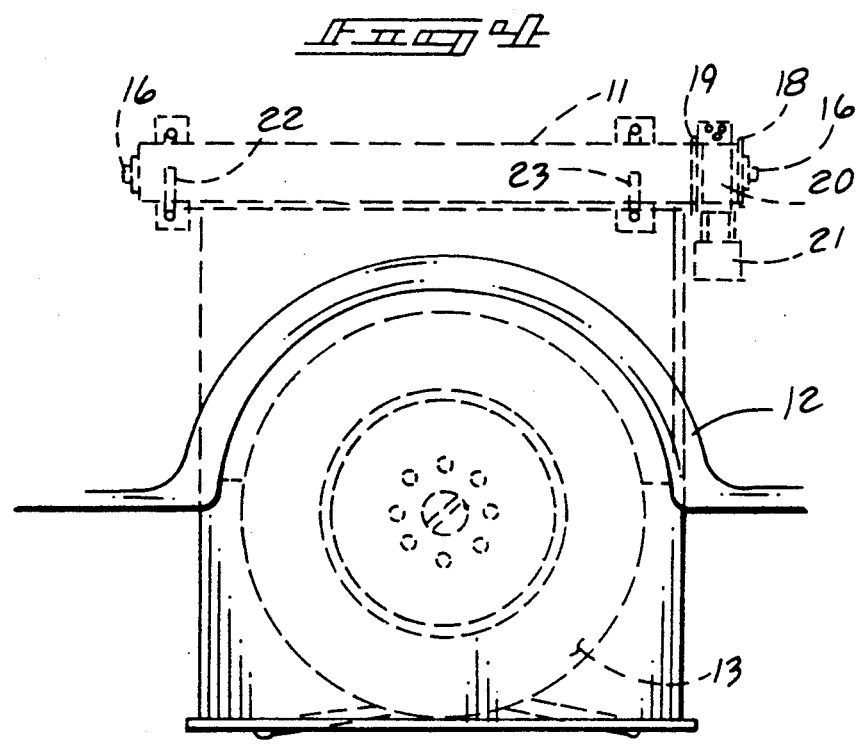

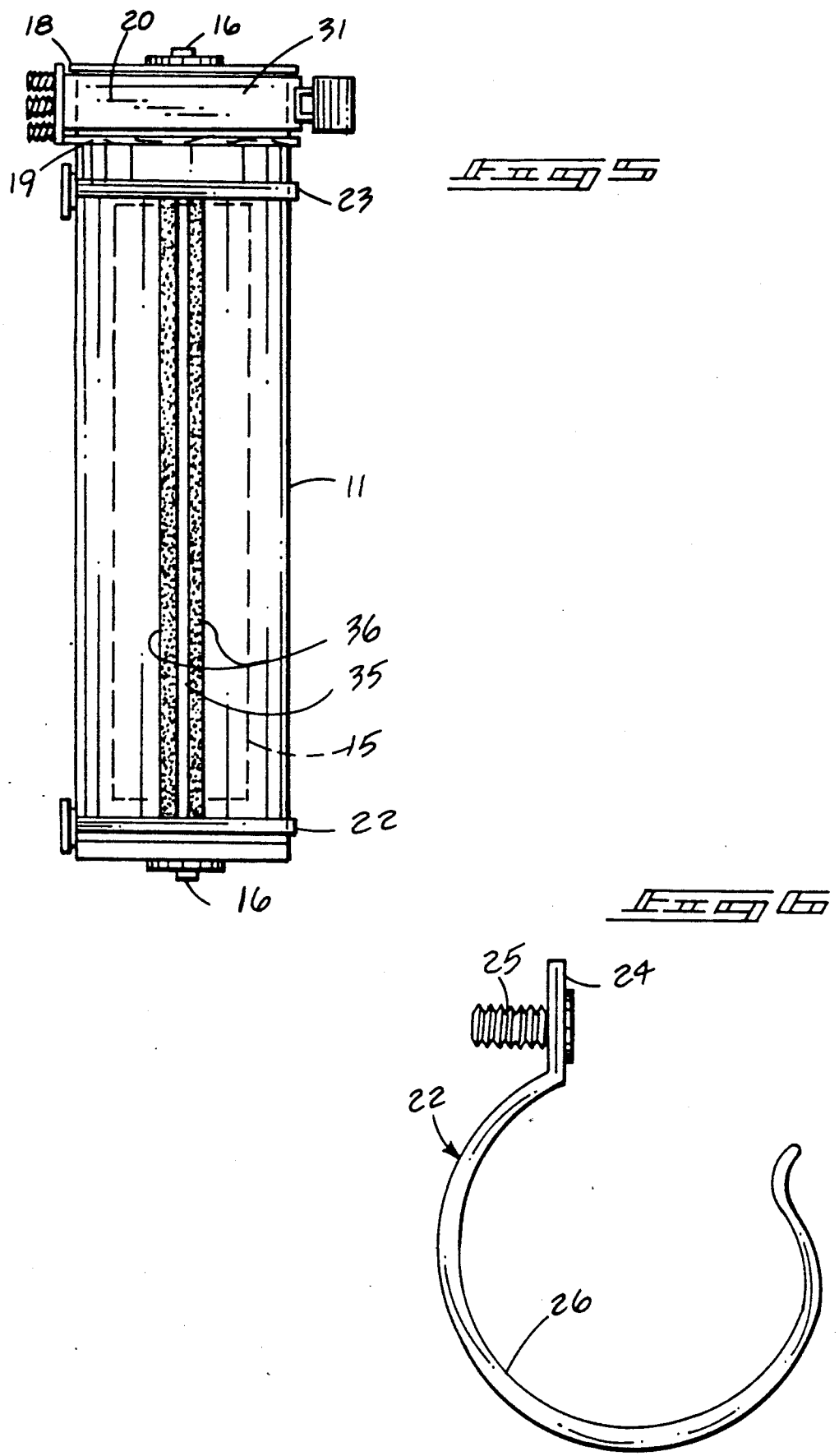

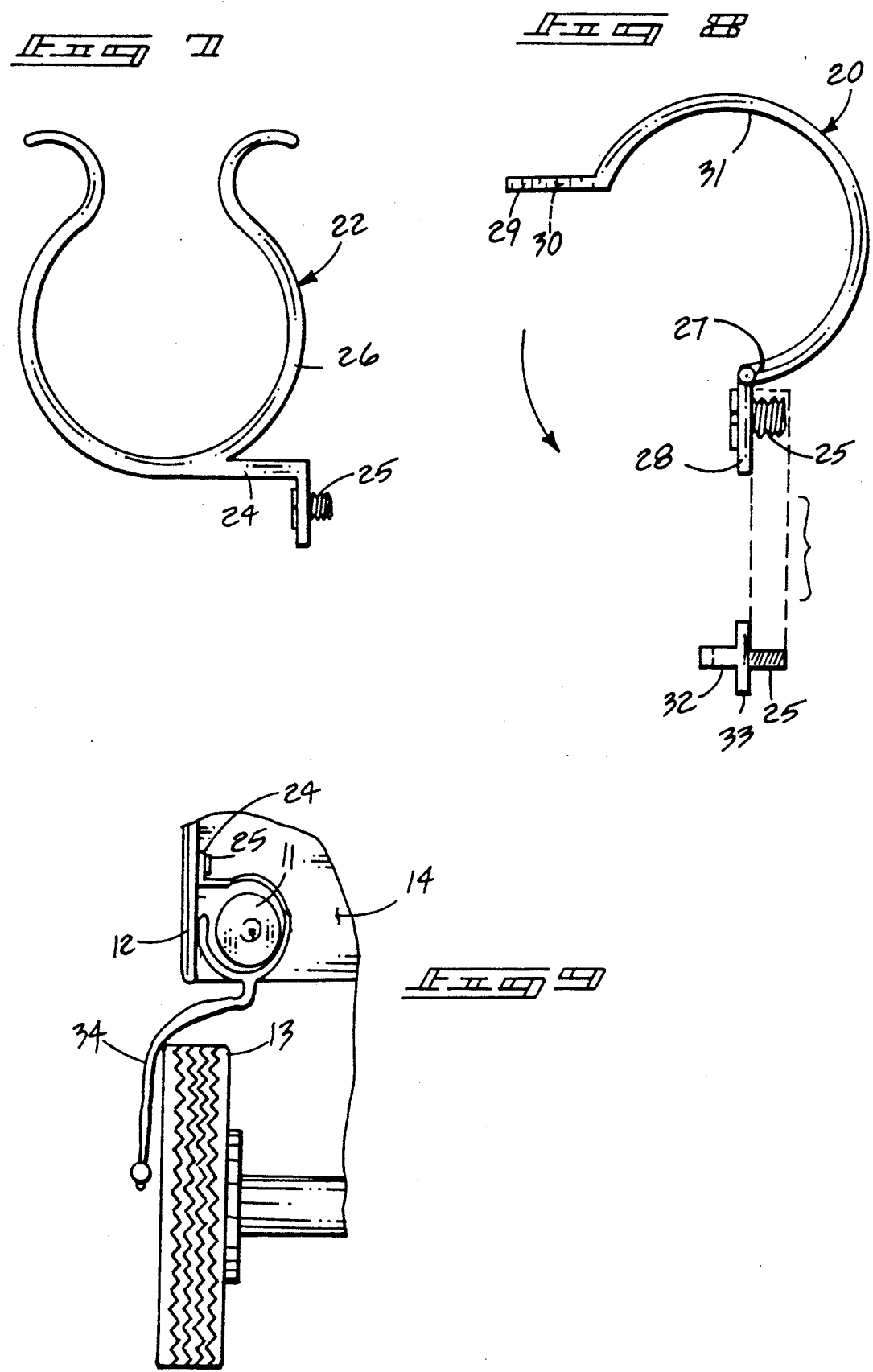

TIRE COVER APPARATUS

BACKGROUND OF THE INVENTION

1. Field of the Invention

The field of the invention relates to tire covers, and more particularly pertains to a new and improved tire cover apparatus wherein the same permits selective and complete covering of a tire mounted within an automobile fender well housing.

2. Description of the Prior Art

Vehicular tires and the like are subject to deterioration particularly when utilized for transport of recreational vehicles and the like as such tires are subject to continuous oxidation by exposure to sun and elements as well as to unpleasant contact with animals. The prior art has provided various tire covers of various configurations but has heretofore failed to provide an organization that conveniently and retractively permits covering of an associated tire during periods of exposure of the tire to environmental elements. Examples of the prior art include U.S. Pat. No. 3,326,259 to MCCOLLEGAN includes a telescoping housing mounted within a further housing to permit encompassing of a tire particularly when a tire is provided in an open and stored configuration.

U.S. Pat. No. 1,889,776 to CROCKER provides a tire cover wherein a covering mounts about the tire in an enveloping configuration for storage of a tire.

U.S. Pat. No. 2,440,805 to LYON sets forth a polymeric type plastic covering for use with a tire in a stored orientation within a housing of an automobile.

U.S. Pat. No. 4,126,169 to MAGNUSON et al sets forth a tire covering of flexible configuration to envelope a tire for storage thereof.

U.S. Pat. No. 2,849,045 to ANDERSON utilizes a tire covering that is mounted by spring fasteners to a forward surface of a tire to protect the tire when mounted to an associated vehicle.

As such, it may be appreciated that there continues to be a need for a new and improved tire cover apparatus wherein the same addresses both the problems of ease of use as well as effectiveness in construction and permitting encompassing securement and retraction of the organization during periods of non-use relative to an associated vehicular body mounting a tire thereunder.

SUMMARY OF THE INVENTION

In view of the foregoing disadvantages inherent in the known types of tire covering apparatus present in the prior art, the present invention provides a new and improved tire cover apparatus wherein the same permits manual extension of a covering flap relative to an exposed surface of a tire when mounted to environmental conditions. As such, the general purpose of the present invention, which will be described subsequently in greater detail, is to provide a new and improved tire cover apparatus which has all the advantages of the prior art tire cover apparatus and none of the disadvantages.

To attain this, the tire cover apparatus of the instant invention includes a tire cover apparatus including a cylindrical elongate housing rotatably and retractively mounting a flexible curtain therewithin. The curtain is directed through elongate slot wherein the slot includes a covering of felt strips to effectively clean and maintain the curtain in an operative condition minimizing contamination of the curtain when maintained interiorly of the housing. A plurality of axially spaced clamps secure the housing in combination with an interior flange of an associated vehicular body including a mounting flange to prevent unauthorized removal of the housing relative to the automotive flange.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tire cover apparatus which has all the advantages of the prior art tire cover apparatuses and none of the disadvantages.

It is another object of the present invention to provide a new and improved tire cover apparatus which may be easily and efficiently manufactured and marketed.

It is a further object of the present invention to provide a new and improved tire cover apparatus which is of a durable and reliable construction.

An even further object of the present invention is to provide a new and improved tire cover apparatus which is susceptible of a low cost of manufacture with regard to both materials and labor, and which accordingly is then susceptible of low prices of sale to the consuming public, thereby making such tire cover apparatuses economically available to the buying public.

Still yet another object of the present invention is to provide a new and improved tire cover apparatus which provides in the apparatuses and methods of the prior art some of the advantages thereof, while simultaneously overcoming some of the disadvantages normally associated therewith.

Still another object of the present invention is to provide a new and improved tire cover apparatus which may be compactly stored when not being utilized.

Yet another object of the present invention is to provide a new and improved tire cover apparatus wherein the same addresses both the problems of ease of use as well as permitting manual manipulation of a conveniently positioned storage housing mounting a flexible curtain therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic front view taken in elevation of the instant invention.

FIG. 4 is an orthographic frontal view taken in elevation in phantom of the instant invention in association with an automotive body and fender well organization.

FIG. 5 is an orthographic bottom view of the instant invention.

FIG. 6 is an orthographic side view of a mounting clamp utilized by the instant invention.

FIG. 7 is an orthographic view of a further mounting clamp utilized by the instant invention.

FIG. 8 is an orthographic side view of a locking clamp utilized by the instant invention.

FIG. 9 is an orthographic end view taken in elevation of the instant invention in an extending configuration relative to an underlying tire.

DESCRIPTION OF THE PREFERRED EMBODIMENT

Figure 1:
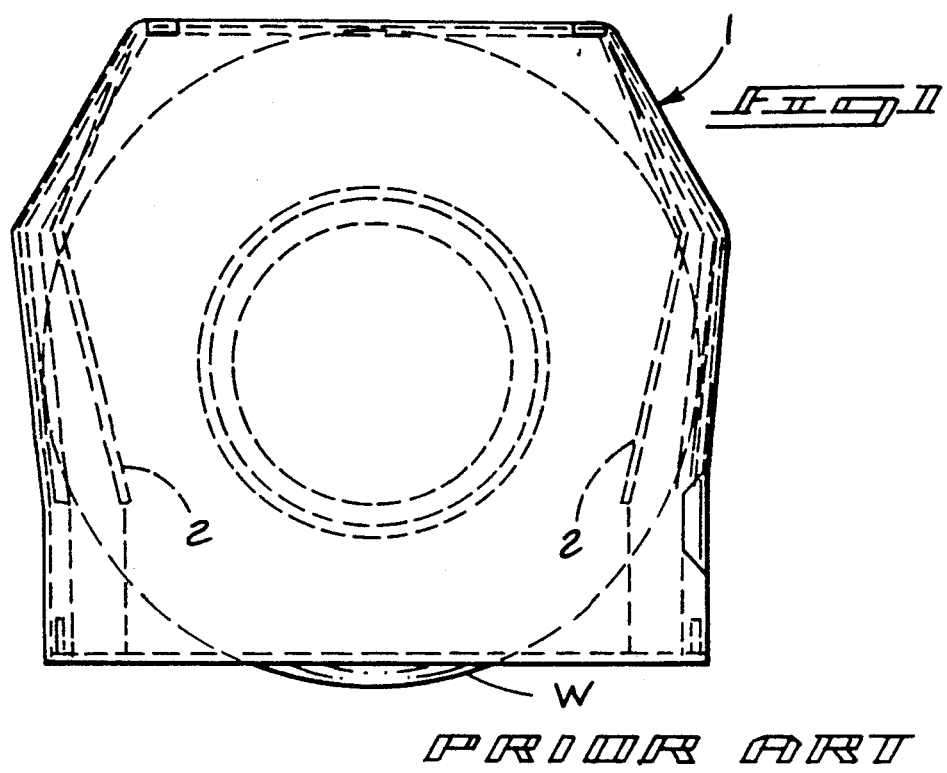
FIG. 1 is an orthographic view taken in elevation of a prior art tire cover apparatus.
Figure 2:
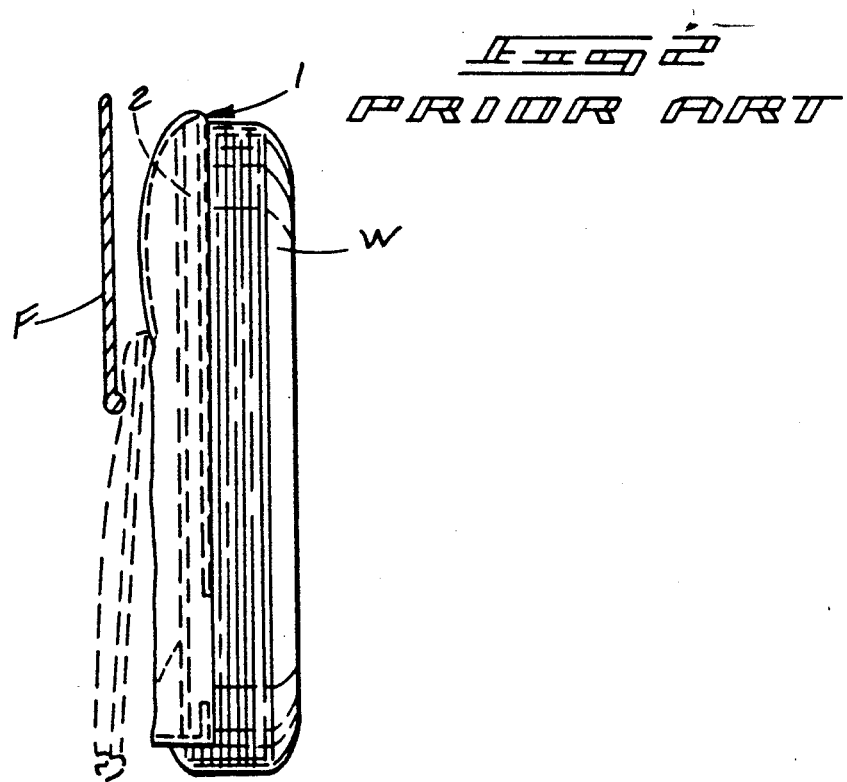
FIG. 2 is an orthographic end view taken in elevation of the tire cover apparatus of FIG. 1.

With reference now to the drawings, and in particular to FIGS. 1 to 9 thereof, a new and improved tire cover apparatus embodying the principles and concepts of the present invention and generally designated by the reference numeral 10 will be described.

FIG. 1 illustrates a prior art tire covering apparatus 1 comprising a flexible canopy mounted in a partial covering of an associated tire or wheel W wherein a plurality of diametrically opposed spring clips 2 engage opposed surfaces of the associated wheel W for securement of the covering apparatus 1 thereto.

More specifically, the tire cover apparatus 10 of the instant invention essentially comprises an elongate cylindrical housing 11 mounted to an interior surface of a fender body flange 12 (see FIGS. 4 and 9) wherein the flange overlies a fender wheel cavity 14 containing a wheel or tire 13 therewithin. The cylindrical housing 11 includes a spindle core 15 including spindle core axles 16 extending exteriorly through each end of the cylindrical housing 11 wherein the spindle core includes a coil return spring 17 mounted to the spindle core 15 interiorly thereof to effect return of a flexible curtain 34 mounted retractably about the spindle core 15. Adjacent a right forward end of the housing 11 is a first housing flange 18 spaced from a second housing flange 19 including a housing locking hasp 20 wherein the hasp 20 is mounted to an interior surface of the body flange 12 to prevent unauthorized removal of the housing 11 relative to the flange 12. A lock member 21 associates a respective lock flange 29 (see FIG. 8) including a slot 30 receiving a tongue member 32 therethrough directed through the slot 30 to mount the lock 21 thereto. The locking hasp 20 includes a loop support 31 defining an arc substantially equal to 270 degrees hingedly mounted by a hinge 27 to a mounting flange 28 mounted to the body flange 12. In a spaced relationship arranged overlying the mounting flange 28 is a tongue member flange 33 including a tongue 32 mounted orthogonally relative to the forward surface of the tongue member flange 33. The tongue member flange 33 as well as the mounting flange 28 each include a threaded fastener 25 mounted to the body flange 12.

A first support member 22 is mounted about the housing 11 spaced from a second support member 23 to support the housing 11 therewithin wherein each support member includes a semi-cylindrical cradle 26 defining an arc of substantially 270 degrees a cradle support flange 24 including a threaded fastener 25 mounted to the interior surface of the body flange 12.

The flexible curtain 34 is directed exteriorly of the housing 11 through an elongate housing slot 35 coaxially arranged through the wall of the housing 11 parallel to the spindle core 15. A plurality of felt lined opening strips 36 are mounted about the housing slot 35 to maintain the flexible curtain 34 free of debris and like contaminants to prevent such contaminants from entering the cavity of the cylindrical housing 11. Accordingly the slot 30 is defined by a width substantially equal to a predetermined width of the flexible curtain 34.

As to the manner of usage and operation of the instant invention, the same should be apparent from the above disclosure permitting the flexible curtain 34 to extend downwardly overlying the wheel or tire 13 wherein the predetermined length of the flexible curtain 34 is substantially equal to the diameter of the wheel or tire 13 plus a predetermined spacing of the spindle core 15 above the tire 13 in use.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

What is claimed as being new and desired to be protected by Letters Patent of the United States is as follows:

1. A tire cover apparatus in combination with a fender body flange of an associated vehicle wherein the fender body flange includes a tire defined by a predetermined diameter rotatably mounted underlying the fender body flange wherein the apparatus comprises an elongate cylindrical housing fixedly mounted to an interior surface of the fender body flange overlying the wheel, and elongate flexible curtain retractably mounted relative to the cylindrical housing, and wherein the curtain is defined by a predetermined length, and the curtain is mounted to the interior surface of the fender body flange a predetermined spacing above the wheel wherein the predetermined length of the flexible curtain is substantially equal to the predetermined diameter of the wheel and the spacing of the housing above the wheel, and wherein the housing includes a spindle rotatably mounted within the cylindrical housing, the spindle mounting the curtain thereabout, and the spindle including an internal spring to bias the spindle in a retracted position to secure and retract the flexible curtain within the cylindrical housing, and wherein the cylindrical housing includes an elongate slot coextensively formed through the cylindrical housing arranged coaxially parallel to an axis defined by the cylindrical housing, and the slot includes a fibrous strip mounted to each side of the slot in contact with the flexible curtain, and the slot is defined by a predetermined width substantially equal to a curtain width defined by the flexible curtain to effect cleaning of the curtain when retracted within the cylindrical housing preventing contamination and debris from the entering the cylindrical housing, and wherein the cylindrical housing includes a right end and a left end, the right end including a first flange spaced from a second flange, the flanges spaced apart a predetermined distance, and a locking hasp member selectively mounted between the first flange and the second flange about the cylindrical housing to secure the cylindrical housing to the fender body flange.

2. Apparatus as set forth in claim 1 wherein the hasp member includes a loop support hingedly mounted to a hasp flange, the hasp flange mounted to the fender body flange, and the support hingedly mounted including elongate hinge to the support flange, and the loop support including an outwardly directed lock flange, the lock flange including a flange slot directed therethrough, the flange slot cooperative with a tongue member, the tongue member including a tongue member flange, the tongue member flange including a fastener securing the tongue member flange to the fender body flange above the support flange.

3. Apparatus as set forth in claim 2 including a lock directed through the tongue member to secure the lock flange against the tongue member flange.

4. Apparatus as set forth in claim 3 including a first and second support member, the first and second support member including a support cradle, each support cradle defining an arc substantially 270 degrees, and each support cradle mounted to a support cradle flange, each support cradle flange mounted to the fender body flange, and the first and second support members mounted coaxially about the cylindrical housing spaced from the hasp member.

* * * * *